Figure 1:
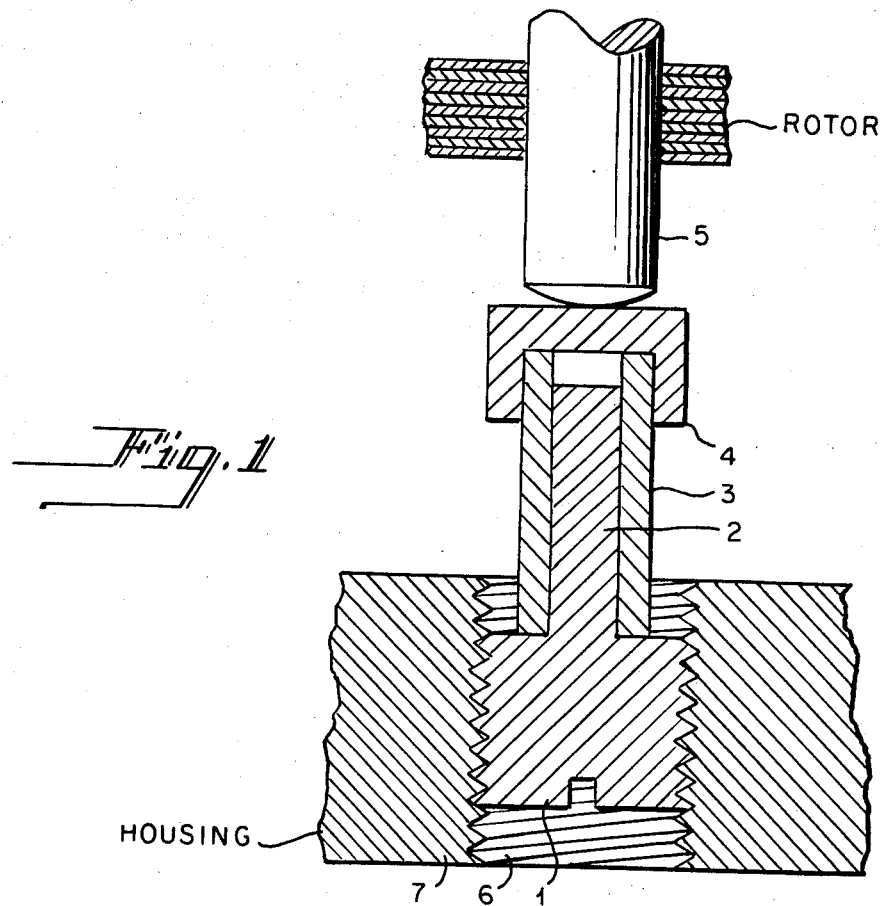

United States Patent
Ott et al.

[15] 3,705,752
[45] Dec. 12, 1972

[54] THRUST BEARING FOR MIDGET MOTORS

[72] Inventors: Hanns Ott, Nurnberg; Hans Peter Latussek, Feucht, both of Germany

[73] Assignee: Siemens Aktiengesellschaft, Berlin and Munich, Germany

[22] Filed: April 2, 1971

[21] Appl. No.: 130,581

[52] U.S. Cl. ..............................308/159, 310/90
[51] Int. Cl. ..................................H02j 9/02
[58] Field of Search.....310/90, 40 MM; 308/10, 166, 308/159

[56] References Cited

UNITED STATES PATENTS

| | | |
|---|---|---|
| 2,703,381 | 3/1955 | Jepson.................................310/90 |
| 2,904,709 | 9/1959 | Lautner................................310/90 |
| 2,564,307 | 8/1951 | Keiser.................................308/166 |
| 1,769,374 | 7/1930 | Kutter.................................308/166 |
| 1,433,037 | 10/1922 | Reid...................................308/166 |

*Primary Examiner*—J. D. Miller
*Assistant Examiner*—R. Skudy
*Attorney*—Curt M. Avery, Arthur E. Wilfond, Herbert L. Lerner and Daniel J. Tick

[57] ABSTRACT

A thrust bearing includes an elastic member received in a cup-shaped threaded member that is secured to a housing structure of a midget motor, and a bearing plate mounted on the elastic member within the cup-shaped threaded member.

3 Claims, 2 Drawing Figures

THRUST BEARING FOR MIDGET MOTORS

Our invention relates to a thrust bearing arranged in the housing or on the bearing shield of a midget motor. The thrust bearing has a thrust bearing plate for bracing the motor shaft.

The axial movements of the rotor occurring by midget motors are transmitted to the motor housing over the thrust bearing and thereby cause undesired running noises which can be significantly amplified if the motor is connected with a structure capable of movement as is often the case, for examples, in tape recorders.

Accordingly, it is an object of our invention to provide a thrust bearing for midget motors which attenuates the transmission of axial rotor oscillations to the motor housing.

According to a feature of the invention, the thrust bearing plate is held to the housing or bearing plate by an elastic intermediate member. According to another feature of the invention, a simple adjustment of the thrust bearing is obtained when the end portion away from the shaft of the elastic intermediate member mounted against a positioning member arranged in the motor housing structure or bearing plate. An especially simple configuration of an adjustable thrust bearing is obtained by placing a hollow cylinder made of elastic material with its one end on the stud of an adjustable screw and mounting the thrust bearing plate on its other end. The length of the thrust bearing can be shortened by configuring the adjustable positioning member as cup-shaped so that its cupped end receives the elastic intermediate member together with the bearing plate in a manner so as to laterally enclose both.

Fastening means for securing the thrust bearing plate to the elastic intermediate member are not necessary if the thrust bearing plate has a cup-shaped configuration and is press-fitted over the elastic hollow cylinder or, if the elastic intermediate member is made from a rubber ring which surrounds a stud of the thrust bearing plate.

Figure 2:
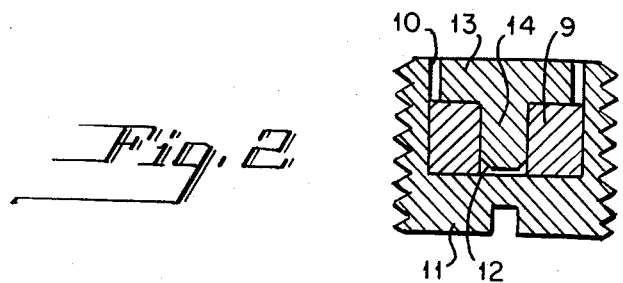

The invention will now be described with reference to the drawings wherein:

FIG. 1 illustrates a thrust bearing according to the invention wherein an elastic hollow cylinder is placed over the stud of an adjustable screw; and FIG. 2 illustrates an alternative embodiment of the thrust bearing according to the invention wherein an elastic ring is placed in an adjustable screw having a cup-shaped configuration.

FIG. 1 illustrates an adjustable screw 1 having a stud 2 joined thereto. An elastic hollow cylinder 3 is placed upon the stud 2. A cup-shaped thrust bearing plate 4 is pressfitted to the free end of the hollow cylinder. A motor shaft 5 braces itself against the plate 4. The adjustable screw 1 threadably engages a winding bore 6 of the motor housing structure 7, that is, the motor housing or bearing plate.

FIG. 2 illustrates an embodiment of a thrust bearing having an especially short construction length. Elastic ring 9 is placed in the cup-shaped opening 10 of the adjustable screw 11. A thrust bearing plate 13 having an axial extension 14 is mounted on the ring 9 with the axial extension extending into the opening 12 of the latter.

By means of the axial intermediate member, that is preferably made of rubber, the axial oscillations of the rotor are so strongly attenuated that no undesired running noises occur. A midget motor equipped with such a thrust bearing can also be used as a drive for tape recorders without the play-back qualities of the tape recorder being affected by running noises of the motor.

The invention is not limited to the embodiments illustrated in the drawing, for example, besides a form-fit fastening, the thrust bearing plate can also be joined with the elastic intermediate member by gluing both portions with a suitable glue material. In addition, the thrust bearing according to FIG. 2 can, for example, be configured so that the side wall of the cup-shaped end is pulled forward and bent over radially toward the central axis so that the bent over end of the side wall constitutes a radial bearing. By means of such a configuration of the thrust and radial bearing, there is provided the possibility of a shortened construction length of the motor housing.

Of course, further obvious modifications will occur to those skilled in the art according to the spirit and scope of the invention.

We claim:

1. In a midget motor having a housing structure and a rotor subject to oscillating axial movements during operation of the motor, the rotor having a shaft for supporting the same in the housing structure, a threaded member secured to said housing structure, a thrust bearing comprising an elastic member carried by said threaded member, and a bearing plate mounted on said elastic member, said threaded member being cup-shaped and being provided with an opening in which said elastic member and said bearing plate are received.

2. Thrust bearing according to claim 1 wherein said threaded member is an adjusting screw.

3. Thrust bearing according to claim 1 wherein said elastic member is a rubber ring having a central opening and said bearing plate is formed with a projection extending axially from one face thereof through the central opening of said rubber ring.

* * * * *